Aug. 3, 1954
E. E. KUHARY ET AL
2,685,453
AUTOMATIC HITCH FOR TRACTORS
Filed Jan. 18, 1952
3 Sheets-Sheet 1
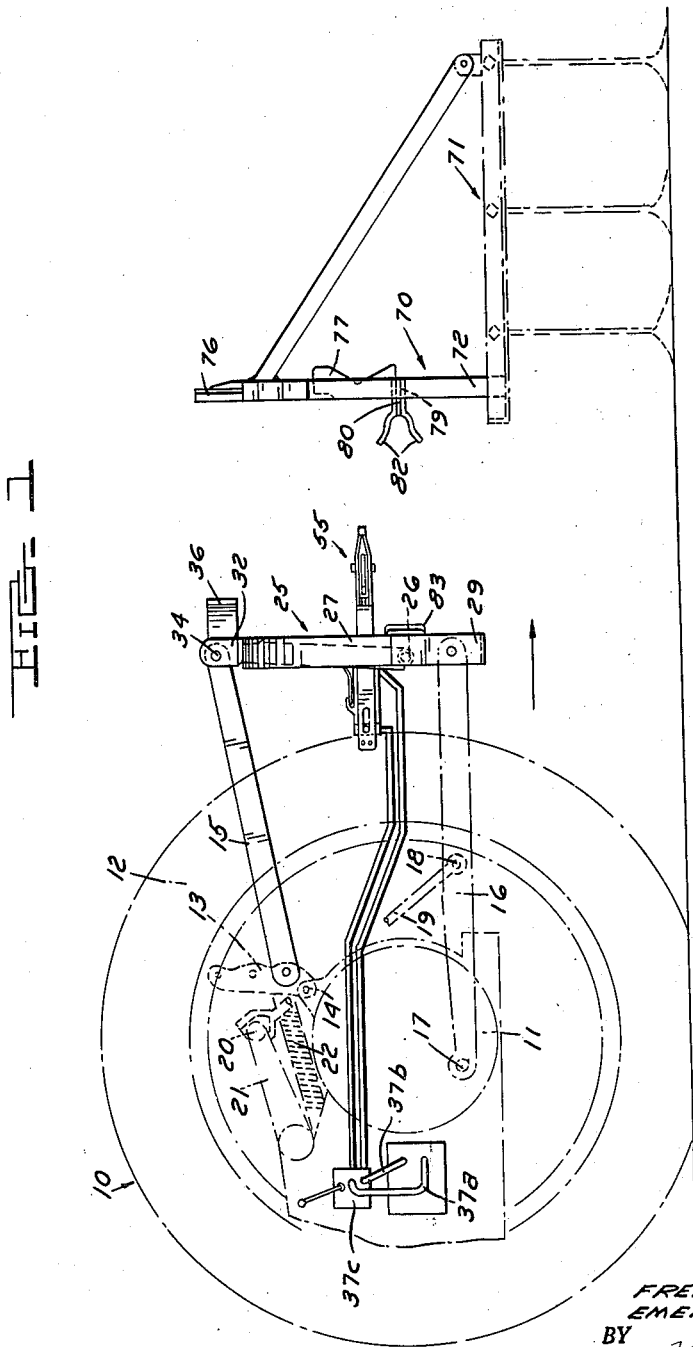
INVENTORS
FREDERICK D. SAWYER
EMERY E. KUHARY
BY
ATTORNEYS

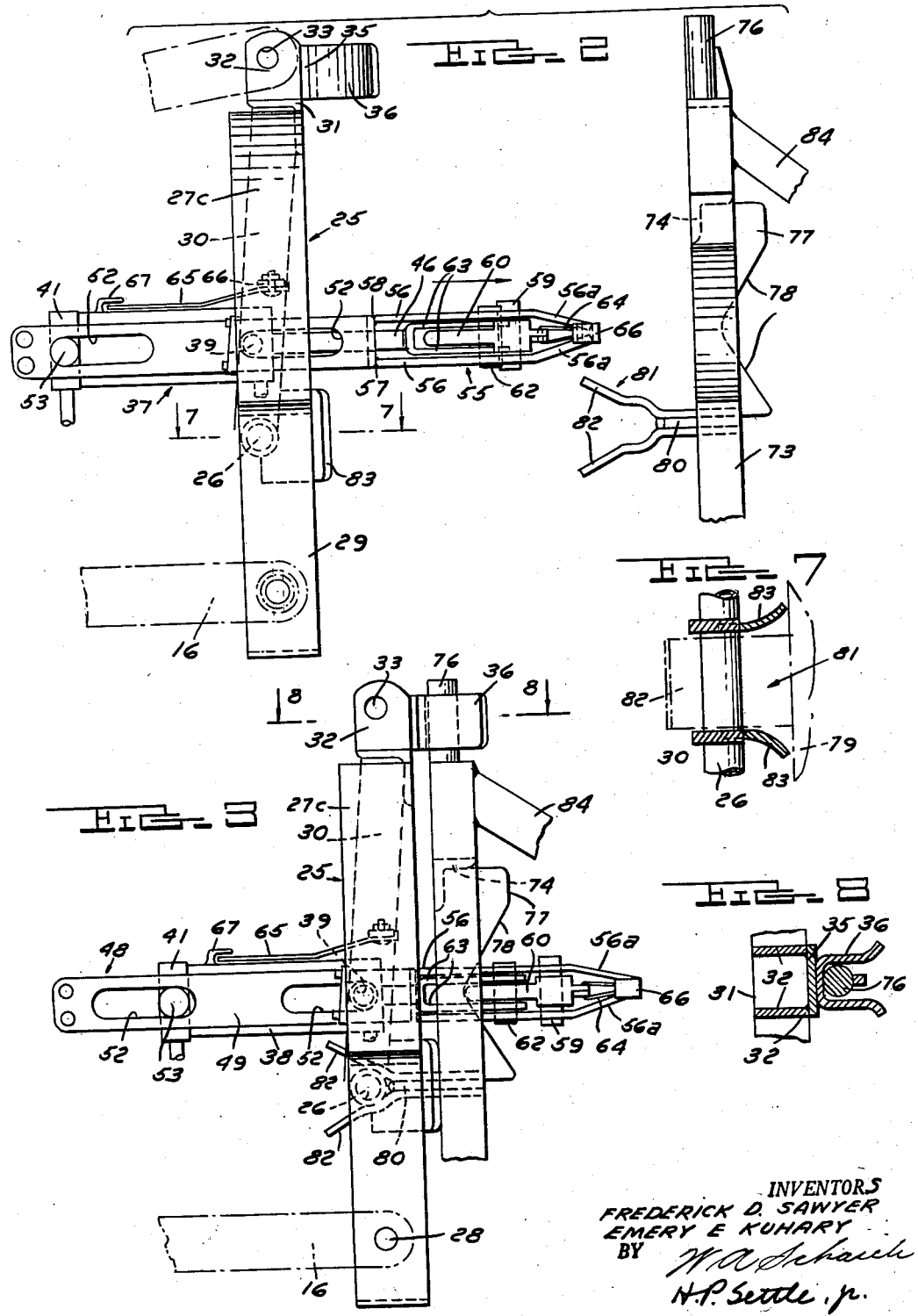

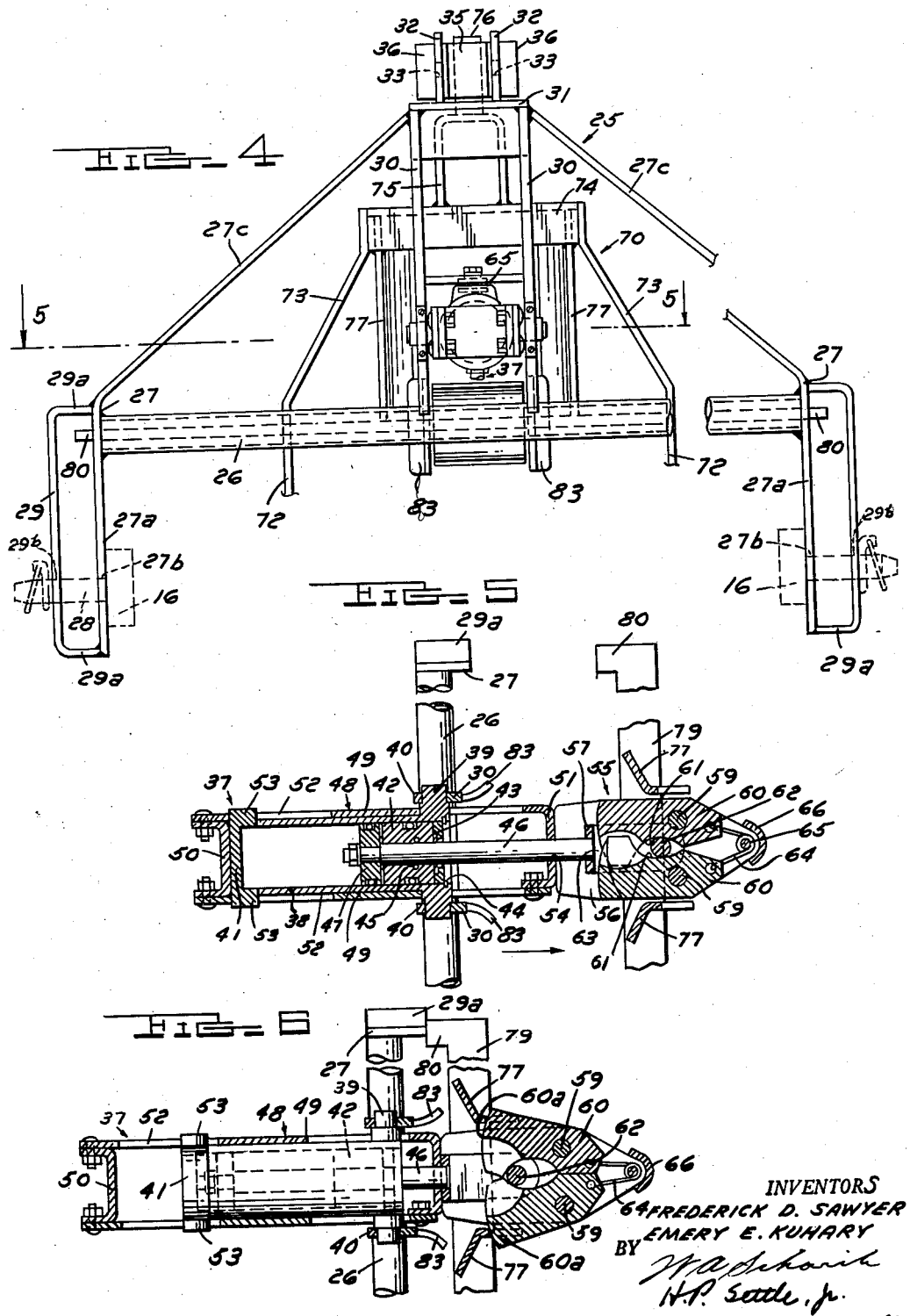

Patented Aug. 3, 1954

2,685,453

UNITED STATES PATENT OFFICE 2,685,453

AUTOMATIC HITCH FOR TRACTORS

Emery E. Kuhary, Royal Oak, and Frederick D. Sawyer, Wayne, Mich., assignors, by mesne assignments, to Ford Motor Company, Dearborn, Mich., a corporation of Delaware Application January 18, 1952, Serial No. 267,165

16 Claims. (Cl. 280—461)

The present invention relates to an implement hitch for tractors and more particularly to a device whereby a three point implement-tractor connection linkage is converted to a single point, remotely controllable connection (i. e., controllable by the operator from the tractor seat) while retaining the desirable features of the multipoint linkage.

The three point tractor-implement linkage, as provided on the well-known Ford tractor, possesses the advantages of lateral steering through forwardly converging lower link elements, power-lifting of mounted implements, constant draft control by top link reaction against an hydraulic system control means, and weight transfer for additional traction during the use of tillage implements. It would be desirable to provide a remotely controllable, power energized means for connecting a tractor to an associated implement in such a manner that these advantages would be retained, yet the tractor could connect or disconnect from any implement without requiring the operator to leave the tractor seat. However, in order that the use of power energized means may be feasible and also for operator convenience, it is desired that a single connection point be established and that this single point be correlated with the implement and the tractor in such a manner that an effective three point connection is preserved.

The present invention fulfills these requirements by the provision of means for adapting the heretofore utilized three point tractor linkage for attachment at a single point to an associated implement. More particularly, the present invention includes a linkage sub-frame pivotally connecting the rear ends of the link elements and an implement sub-frame rigidly joined to the implement to replace the conventional implement A-frame. The sub-frames are adapted for interengagement so that relative movement of the implement and the tractor causes corresponding and concurrent shifting of the frames and lateral and vertical movement of the links. Power energizable means carried by one of the sub-frames, preferably the linkage sub-frame, are provided for engaging the other of the frames to pull the same into contact with the first frame. Thus, the sub-frames are pulled or "snubbed" into tight engagement at a plurality of spaced points upon actuation of the power means. Each of the frames is generally triangular in configuration with the engaging portions of the frames being laterally and vertically spaced from the central attachment point. In this manner, both lateral and vertical relative movement of the implement and the tractor are reflected upon the linkage frame and consequently upon the linkage itself, so that the advantages of lateral steering, power-lifting, constant draft control, and traction weight transfer are retained. During attachment, the power means is energized toward the tractor by the application of a given amount of force, and the reverse application of substantially the same or a greater force will cause uncoupling of the implement and the tractor against the resistance of the power means, thereby affording a "break away" connection for preventing damage to a tillage implement or the like utilized in connection with the present hitch.

It is, therefore, an important object of the present invention to provide an improved implement hitch for tractors whereby a three point implement-tractor connection linkage is adapted for single point, remotely controlled connection while retaining the desirable features of the three point linkage.

Another important object is the provision of a remotely controllable, single point connection for joining an implement to a tractor and including separate, juxtapositioned frames mounted on the tractor and the implement, the frames being utilized to reflect relative tractor-implement lateral and vertical movement upon a tractor linkage control system.

It is a further object to provide a tractor-implement connection including a pair of generally triangular, abutting tractor and implement frames adapted for connection at a single central point and having abutting portions laterally and vertically spaced from the single point, so that relative lateral and vertical movement between the implement and the tractor may be utilized for implement steering and to effect actuation of a tractor draft control system.

Still another important object is the provision of a pair of abutting frames mounted on a tractor and an implement, respectively, and power means for retaining the frames in abutting relation, the forces exerted by the power means normally acting toward the tractor and providing a predetermined retaining force which, when exceeded by resistance of the implement to forward movement, releases the frames from abutting relation, thereby preventing damage to the implement by excessive forces thereon.

The specific nature of this invention, as well as other objects and advantages thereof, will become apparent to those skilled in the art from the following detailed descritpion, taken in conjunction with several sheets of drawings on which, by way of preferred example only, is illustrated one embodiment of this invention.

On the drawings:

Figure 1 is a side elevational view of an implement hitch of the present invention with the tractor and implement being longitudinally spaced prior to connection;

Figure 2 is an enlarged fragmentary elevational view similar to Figure 1 illustrating only the hitch elements;

Figure 3 is an elevational view similar to Figure 2 showing the hitch elements in connected relation;

Figure 4 is an end view of the hitch elements taken rearwardly of the tractor and facing toward the implement;

Figure 5 is an enlarged sectional view, with parts shown in elevation, taken along the plane 5—5 of Figure 4 and illustrating the hitch elements during connection of the same;

Figure 6 is a sectional view similar to Figure 5 illustrating the elements in connected position;

Figure 7 is a fragmentary sectional view taken along the plane 7—7 of Figure 2; and Figure 8 is a sectional view taken along the plane 8—8 of Figure 3.

As shown on the drawings:

In Figure 1, reference numeral 10 refers generally to a tractor having a rear axle housing 11 joining tractor rear wheels 12 and carrying an upstanding control bracket 13 pivoted to the top of its rear axle housing, as at 14, and to a trailing central top link 15. The lower portions of the rear axle housing also carry laterally spaced trailing draft links 16 universally pivoted at 17 to the tractor housing. The draft links 16 are pivotally connected at 18 to upwardly projecting lift arms 19 connected at their upper ends, as at 20, to vertically movable rock arms 21. The rock arms 21 are power-liftable by energization of a tractor mounted hydraulic system (not shown) such as is well-known in the art, and the control bracket 13 is adapted to react against a control spring 22 which is likewise connected to the hydraulic system of the tractor to provide constant draft control. These portions of the tractor-implement linkage are old in the art.

The trailing extremities of the triangularly arranged hitch links 15 and 16 are joined by a tractor mounted sub-frame 25 best seen in Figures 2, 3 and 4. The tractor sub-frame is generally triangular in configuration and comprises a centrally located, laterally extending tubular brace 26 joined at each end to a vertically extending strap 27 having a depending end portion 27a which is apertured adjacent its lower edge, as at 27b, to receive therethrough laterally extending pins 28 carried at the extremities of the lower links 16. The lower portions 27a of each of the straps 27 carry a reinforcing web 29 laterally spaced from the outer surfaces of the legs 27a and joined thereto by inwardly projecting terminal portions 29a. The webs 29 are each provided with an aperture 29b aligned with the apertures 27b to receive the pins 28 therethrough. The straps 27 are provided with inwardly inclined upper portions 27c which are joined at their upper ends to vertically extending plates 30, the plates 30 having their lower extremities fixedly secured, as by welding, to the tube 26. The spaced plates 30 are joined at their upper ends by a cover plate 31 which serves to support upstanding laterally spaced pivot plates 32 apertured as at 33 to receive therethrough a pivot pin 34 for securing the trailing end of the top link 15 between the plates 32. The plates 32 also are provided with a joining plate 35 joining the rear extremities thereof and carrying a generally U-shaped guide member 36 (Figures 2, 4, and 8), for a purpose to be hereinafter more fully described.

The vertically extending plates 30 are adapted to carry therebetween a power means indicated generally at 37 and preferably taking the form of a double acting hydraulic cylinder deriving power, as through pressure fluid lines 37a and 37b, from the tractor hydraulic system and controllable by a valve means 37c interposed in said lines. The cylinder 37 comprises an open ended cylindrical tube 38 (Figures 5 and 6) provided with laterally extending pivot bosses 39 receivable within apertures 40 formed in the plates 30 in spaced relation above the tube 26. The forward end of the cylindrical tube 38 is closed by a cover plate 41 and the open rear end of the tube is closed by a closure block 42 positioned within the tube and bottomed against a retaining washer 43 abutting a snap ring 44. The block 42 is provided with an annular seal ring 45 contacting an actuating rod 46 having at one end thereof a piston 47 which is reciprocable within the tube 38.

The cylindrical tube 38 is enclosed within a slidable carriage 48 best seen in Figures 2, 3, 5 and 6. The carriage 48 comprises side plates 49 of generally rectangular outline joined at the rear end by a yoke 50 and at the front end by an inturned flange 51 on one of the side plates. The side plates are slotted, as at 52, the forward one of the slots 52 receiving therethrough the pivot bosses 39 of the cylinder 38 and the rear one of the slots 52 receiving therethrough similar projections 53 formed in the forward cover plate 41. The housing 49 is thus journaled for sliding movement relative to the cylinder and such sliding movement may be seen by comparison of Figures 5 and 6.

The extreme end of the rod 46 projecting beyond the block 42 also projects through an aperture 54 formed in the side plate flange 51. This end of the rod carries a locking head indicated generally at 55 and including vertically spaced plates 56 between which is located a vertically extending plate 57 to which the rod 46 is secured, so that receiprocating movement of the rod also reciprocates the plate 57 between the plates 56. From Figure 2 it will be seen that the plates 56 are welded or otherwise rigidly secured as at 58 to the side plates 49 of the slide.

The plates 56 are also provided with vertically extending pivot pins 59, the pins joining the plates and being laterally spaced to providet vertical pivot axes for a pair of laterally juxtapositioned locking dogs 60 interposed between the plates 56. The dogs 60 are provided with mating facing arcuate recesses 61 in their inner faces, and these recesses are adapted to receive therebetween a cam pin 62, the pin 62 being carried by a clevis 63 mounted at the forward extremity of the rod 46 and joined to the vertical plate 57 for sliding movement relative to the plates 56. Immediately forwardly of the recesses 61, the dogs are provided with interleaved projections 60a aiding in retaining the dogs in alignment. The individual dogs 60 are joined at their forward ends to a hair spring 64 which is lapped about a stationary pin 65 mounted between the plates 56, and the pin and dogs are protected by a rigid bumper 66 joining the plates 56 at their forward ends. It will be noted that the plates 56 are inclined toward one another at their extreme forward ends, as at 56a and that the forward ends of the plates and corresponding portions of the dogs 60 are laterally inclined so as to provide a sharpened forward end to the locking mechanism.

As best seen by comparison of Figures 5 and 6, forward actuation of the piston 47 and the rod 46 will cause the cam pin 62 to be moved forwardly to approximately the center of the facing arcuate recesses 61, and the dogs 60 will be retracted by the spring 64, so that their outer surface lie substantially flush with corresponding vertical edges of the plates 56. This retraction of the cams 60 is actually effected by the hair spring 64 which, in attempting to spread, causes movement of the dogs 60 about pivot pins 59. When the power mechanism is actuated so that the piston 47 and the rod 46 are moved toward the closure plate 41, i. e., forwardly toward the tractor, the slide 48 is moved forwardly with this movement being accommodated by the slots 52, and the same movement of the rod pulls the cam pin 62 rearwardly in contact with the walls of the slots 61, so that the dogs 60 are actuated laterally outwardly to their positions illustrated in Figure 6. The purpose of this camming action will be hereinafter described in further detail in connection with other portions of the hitch of the present invention. It will be noted that the cylinder 37 is pivotal about the pins 39 journaled in the plates 30, and the cylinder is biased to a central, substantially horizontal position by a leaf spring 65 secured at one end to a plate 66 extending laterally between the plates 30 and having its other end inserted beneath an undercut stop 67 fixedly mounted on the cylinder 37.

The frame 25 hereinbefore described is adapted to abut a frame 70 positioned upon an implement 71. As illustrated, the implement 71 is a cultivator although it will be appreciated that any suitable farm implement may be so utilized. The implement frame 70 comprises generally vertically extending side strap members 72 joined to the structural frame of the implement 71 and projecting thereabove with the upper portions of the frame elements 72 being upwardly and inwardly deflected as at 73. The extreme upper ends of the elements 72 are joined by a laterally extending angle iron section 74 surmounted by a fixed U-shaped bracket 75 which in turn carries an upwardly projecting, generally cylindrical top pin 76 adapted to be received between the arms of the guide bracket 36 carried by the frame 25 mounted on the tractor. The angle iron section 74 also supports depending guide plates 77 having the rear extreme edges thereof notched as at 78 and vertically alignable with the power means 37 so as to receive the laterally extending forward edges 60a of the dogs 60 thereagainst as best seen in Figure 6.

The frame members 72 are joined intermediate their height by a laterally extending abutment plate 79. This plate 79 extends laterally beyond the members 72 and the extreme ends thereof are provided with forwardly projecting abutment pads 80 longitudinally aligned with the lower portions 27a of the strap 27 of the tractor mounted frame 25.

The abutment plate 79 carries at a central portion thereof a guide bracket 81 projecting forwardly therefrom and having outstretched, vertically spaced, resilient fingers 82 adapted to receive the tube 26 of the frame 25 therebetween. The tube 26 also carries laterally spaced guide plates 83 which are adapted to receive the guide bracket fingers 82 therebetween. The guide bracket fingers 82 and the guide plates 83 cooperate to laterally and vertically guide the frame 25 and 70 into accurate juxtaposition and final abutment. However, the fingers 82 and the plates 83 serve no retaining function, but merely guide the frames into position.

The operation of the hitch illustrated in the drawings and hereinbefore described generally involves initially positioning the tractor and the implement as illustrated in Figure 1, so that the implement and tractor are in substantial longitudinal alignment and so that the frames 25 and 70 are in substantial vertical alignment. It will be noted from Figure 1 that the cylinder-actuated latching mechanism is in its rearmost position, namely the position of Figure 5, wherein the locking head 55 is extended beyond the frame 25 by actuation of the piston 47 to its rearmost position. As the frames approach abutment, the locking head 55 is received between the guiding plates 77 of the implement frame with the outturned arms of the guide plates and the tapered forward end of the locking head aiding in thus positioning these elements. It will also be noted that the latching mechanism is retained in substantially horizontal position by the leaf spring 65.

It is not necessary that the tractor mounted frame be moved rearwardly into complete abutment with the implement frame, since it is only necessary that the head 55 be inserted between the guide plates 77 to such an extent that the dogs 60 are enterable within the notches 78 of the plates 77. After the locking head is thus positioned, the piston 47 is actuated for movement in the reverse, i. e., forward direction. Forward movement of the piston initially draws the cam pin 62 forwardly within the slots 61, against the resistance of the spring 64 tending to retain the cams 60 in their inward positions. The resultant lateral spreading of the cams positions the cam surfaces 60a laterally outwardly so as to abut adjacent surfaces of the guide plates 77, the inclination of the slots 78 tending to center the head vertically in the slots, and the leaf spring 65 accommodating in any necessary vertical movement of the head. Further forward actuation of the rod will pull the implement frame forwardly into engagement with the tractor mounted subframe 25, this engagement involving the positioning of the upstanding top pin 76 between the arms of the guide bracket 36 to be bottomed against the forward extremity of the bracket. The frames are also in engagement at laterally spaced points where the abutment pads 80 contact the rear edge of the straps 27 at either side of the frames. The guide bracket fingers 82 are resiliently deflectable and, although the fingers receive the tube 26 therebetween, the tube is not actually bottomed by the fingers 82 but is merely positioned therebetween.

Thus, it will be seen that the frames are placed in abutment at a plurality of laterally and vertically spaced points and are retained in such abutment by the centrally mounted power means 37. This power means thus serves a dual function since it pulls the frames into abutment and then retains the same in abutment. Since the only restraining force applied to the frames to hold them in contact is that of the power means, the power means also serves as a "break away" connection, since any force upon the implement frame which exceeds the restraining force of the power means would cause the frames to be moved from abutment. In this manner, possible damage to the implement by the subjection of the same to an extreme shock load, as upon the striking of an obstruction, will release the implement frame prior to damage to the implement itself.

Of course, the restraining force of the cylinder 37 is applied to the implement frame 70 through the cam pin 62 urging the locking dogs 60 outwardly into contact with the guide plates 77 rigidly mounted on the implement frame. The force tending to separate the frames is exerted by the ground resistance of the implement and this separating force is applied to the locking dogs by the guide plates to urge the plates inwardly, thus tending to cam the pin rearwardly from its locking position of Figure 6. The restraining force and the separating force act through the same lever arm distance, i. e., the lateral distance from the pin to the guide edges 77. Therefore, so long as the hydraulic force on the piston exceeds the force tending to separate the frames, the dogs are retained in the illustrated locking position. However, when the separating force exceeds the restraining force, the pin 62 is cammed to its central position of Figure 5 by the excessive force acting on the dogs to move the same inwardly against the hydraulic force on the pin 62.

It will, of course, be understood that various details of construction may be varied through a wide range without departing from the principles of this invention and it is, therefore, not the purpose to limit the patent granted hereon otherwise than necessitated by the scope of the appended claims.

We claim:

1. An implement hitch comprising a plurality of trailing generally triangularly arranged tractor-mounted hitch links, a subframe joining the trailing free ends of said links, an implement frame of the same general configuration as said subframe, said subframe and said implement frame being adapted for abutting contact at a plurality of laterally and vertically spaced points, and means for actuating said subframe and frame into abutment and for retaining the same in abutment including power means, extensible means carried by said subframe and actuated by said power means for extension beyond said frame and for retraction toward said subframe, and locking means movable with said extensible means and actuated upon initial retraction of said extensible means for engaging said frame to move said frame toward abutment with said subframe upon further retraction of said extensible means.

2. In an implement hitch for tractors, a tractor-mounted subframe, an implement-mounted A-frame, laterally and vertically spaced projections on said subframe and said A-frame for abutment upon juxtaposition of the same, a longitudinally reciprocable latching mechanism carried by said subframe and extensible therebeyond into engagement with said A-frame, and means for retracting said latching mechanism toward said subframe after such engagement to effect abutment of said projections and to retain said frames in abutment.

3. In an implement hitch for tractors, a tractor mounted subframe, an implement mounted A-frame, laterally and vertically spaced projections on said subframe and said A-frame for abutment upon juxtaposition of the same, means on said A-frame defining an aperture, a longitudinally reciprocable latching mechanism carried by said subframe and extensible therebeyond for insertion into and projection beyond said A-frame, and laterally extensible locking means movable with said latching mechanism and actuatable laterally therebeyond for engagement with said A-frame immediately adjacent said aperture, said latching mechanism being retractable toward said subframe after engagement of said locking means with said A-frame to effect abutment of said projections and to retain said frames in abutment.

4. An implement hitch for attaching an implement frame to a tractor having a pair of lower laterally spaced trailing hitch links and a trailing upper link laterally intermediate said lower links, comprising a subframe for joining the free trailing ends of said links, said implement frame being adapted for abutment with said subframe at a plurality of longitudinally and vertically spaced points, power-operated retaining means carried by said subframe generally centrally thereof for movement therewith and readily detachably engageable with said implement frame to retain the same in abutment with said subframe, and power means for operating said retaining means.

5. In combination, a tractor having a power liftable universally mounted laterally spaced lower hitch links and a trailing upper link laterally intermediate said lower links and also universally pivoted to the tractor, a generally triangular subframe mounted on the trailing ends of said hitch links and said upper link for pivoted movement therewith relative to the tractor, an implement having an upstanding A-frame provided with laterally and vertically projecting portions adapted for engagement with said subframe, and latching means carried by said subframe and located centrally thereof for engagement with said implement frame intermediate said projecting portions to retain said portions thereof in engagement with said subframe, whereby movement of said links and said subframe relative to said tractor effect corresponding movement of said implement frame, and said latching means constitutes the sole point of connection of said implement frame.

6. In an implement hitch including abutting tractor-mounted and implement-mounted frames, means for connecting said frames to retain the same in abutment comprising an hydraulic cylinder mounted centrally of said tractor-mounted frame, a piston in said cylinder having a rod reciprocable towards and away from said implement frame, a reciprocable carriage movable longitudinally with said piston, and laterally extensible cam means carried by said carriage and actuated upon reciprocation of said piston for engagement with said implement frame.

7. In an implement hitch including abutting tractor-mounted and implement-mounted frames, means for connecting said frames to retain the same in abutment comprising a power-actuated carriage mounted centrally of said tractor-mounted frame and journaled thereby for power movement towards and away from said implement-mounted frame, guide means on said implement-mounted frame receiving an extreme end of said frame therebetween upon movement of said carriage toward said implement-mounted frame, and latching means extensible transversely beyond said carriage upon initiation of movement of said carriage away from said implement-mounted frame, said latching means engaging said guide means to pull said frames into abutment.

8. In an implement hitch including abutting tractor-mounted and implement-mounted frames, means for connecting said frames to retain the same in abutment comprising a power-actuated carriage mounted centrally of said tractor-mounted frame and journaled thereby for longitudinal extension therebeyond and for return movement, spaced guide means fixed to said implement-mounted frame receiving an extreme end of said carriage therebetween and therebeyond upon extension of said carriage, a latching element pivotally carried by said carriage adjacent said extreme end thereof and transversely extensible therebeyond to engage said guide means, and interengaging means including cooperable camming surfaces on said carriage and said latching element to effect extension of said latching element beyond said carriage upon return movement of said carriage.

9. In a remotely controlled automatic implement hitch including abutting tractor-mounted and implement-mounted frames, spaced vertically and laterally extending projections on one of said frames, guide means on the other of said frames having divergent guide lips between which said projections are respectively insertable to guide said projections into a predetermined position at which said frames are in accurate abutment, interengageable power-operated latching means on said frames for retaining said frames in abutment, and power means for operating and latching means.

10. In an implement hitch including abutting tractor-mounted and implement-mounted frames, a power-actuated latching mechanism carried by said tractor-mounted frame and longitudinally reciprocable towards and away from said implement-mounted frame for engagement with said implement-mounted frame and for latching said frames in abutting relation, means pivotally mounting said latching mechanism for movement relative to said tractor-mounted frame, and laterally spaced guide plates rigidly mounted on said implement-mounted frame, said latching mechanism being insertable between said plates to project therebeyond when said mechanism is fully extended beyond said implement-mounted frame, said guide plates having edge surfaces convergent toward said tractor-mounted frames to define centrally located latching notches in which said latching mechanism is seated upon return movement of said mechanism from its fully extended position, whereby pivoting movement of said mechanism accommodates entry of said latching mechanism in said notches to position said frames accurately relative to one another.

11. In an implement hitch, a pair of complementary hitch frames, one of which has a centrally located opening, spaced vertically and laterally extending guide projections on said one of said frames, correspondingly spaced guide sockets on the other of said frames receiving said projections when said frames are in abutment, latching means carried by said other of said frames and extensible toward said one of said frames through the central opening thereof, and means on said one frame defining a guide socket adjacent said central opening within which said latching means is enterable for securing said complementary frames in abutment.

12. In an implement hitch for tractors having a pair of laterally spaced trailing lower hitch universally pivotally attached to the tractor and power liftable through a tractor-driven power mechanism and an upper trailing compression link universally pivotally attached to the tractor and effective to reflect implement draft on said power mechanism to vertically position said lower links, a generally triangular subframe for joining the free ends of said links, a complementary implement frame adapted to abut said subframe, laterally and vertically spaced portions of said frames being in snug abutment, and a latching mechanism carried by said subframe and engaging said implement frame to constitute the sole means for retaining said frames in abutment, whereby the pivotal characteristics of said hitch links and the reflection of implement draft through said upper link are preserved despite the use of said latching mechanism.

13. In an implement hitch, a pair of complementary tractor-mounted and implement-mounted frames, a fluid pressure actuated cylinder carried by one of said frames, means for energizing said cylinder at a predetermined maximum force, and latching means actuated by said cylinder to retain said frames in abutting relation, said latching means being responsive to a force of greater than said predetermined maximum and tending to separate said frames for releasing said frames from abutment to provide an implement break-away connection.

14. In an implement hitch, a pair of complementary tractor-mounted and implement-mounted frames having laterally and vertically spaced portions adapted for abutment upon juxtaposition of said frames, and latching means carried by one of said frames generally centrally thereof and engageable with a corresponding generally located portion of the other of said frames for retaining the same in abutment by exerting a predetermined maximum restraining force on said other frame, said latching means being responsive to separating force exerted on one of said frames and of a magnitude greater than said predetermined maximum restraining force for releasing said frames from abutment.

15. In an implement hitch for tractors, a pair of complementary tractor-mounted and implement-mounted frames having laterally and vertically spaced portions adapted for abutment upon juxtaposition of said frames, a longitudinally reciprocable latching head journaled by one of said frames for longitudinal movement toward and beyond the other of said frames upon initial juxtapositioning of said frames, locking means movable longitudinally with said head and laterally extensible therebeyond into engagement with said other of said frames, and power means for actuating said head to retract the same toward said one frame with said locking means in engagement with the other of said frames to pull said frames into abutment.

16. In combination with a pair of implement hitch frames adapted for connection to trailing tractor draft links and to an implement, respectively, said frames having laterally and vertically extending abutment surfaces, a reciprocable latching head slidably journaled by one of said frames for movement therebeyond to project through a registering portion of said other frame, a locking element laterally extensible beyond said latching head to lie transversely to the path of movement of said latching head, and power means for retracting said latching head toward said one frame to effect engagement of said abutment surfaces with said locking element engaging said other of said frames to retain said surfaces in engagement.

References Cited in the file of this patent

UNITED STATES PATENTS

| Number | Name | Date |
|---|---|---|
| 1,730,077 | Isachsen | Oct. 1, 1929 |
| 1,900,440 | Ferguson | Mar. 7, 1933 |
| 2,194,623 | Thompson | Mar. 26, 1940 |
| 2,381,258 | Cantral | Aug. 7, 1945 |
| 2,444,919 | Cotton et al. | July 13, 1948 |
| 2,459,731 | Wymore | Jan. 18, 1949 |
| 2,465,641 | Gardner | May 29, 1949 |
| 2,527,613 | Zagurski | Oct. 31, 1950 |

FOREIGN PATENTS

| Number | Country | Date |
|---|---|---|
| 575,650 | Great Britain | Feb. 27, 1946 |